United States Patent
Negley

(10) Patent No.: US 8,328,405 B2
(45) Date of Patent: Dec. 11, 2012

(54) INDEPENDENT CONTROL OF LIGHT EMITTING DIODES

(75) Inventor: Gerald H. Negley, Hillsborough, NC (US)

(73) Assignee: Cree, Inc., Durham, NC (US)

(*) Notice: Subject to any disclaimer, the term of this patent is extended or adjusted under 35 U.S.C. 154(b) by 0 days.

(21) Appl. No.: 12/545,600

(22) Filed: Aug. 21, 2009

(65) Prior Publication Data
US 2009/0310338 A1 Dec. 17, 2009

Related U.S. Application Data

(60) Continuation of application No. 11/865,114, filed on Oct. 1, 2007, now abandoned, which is a division of application No. 11/185,397, filed on Jul. 20, 2005, now abandoned.

(51) Int. Cl.
*F21V 7/04* (2006.01)
(52) U.S. Cl. ........................ 362/612; 362/611; 362/800
(58) Field of Classification Search .......... 362/459–549, 362/800
See application file for complete search history.

(56) References Cited

U.S. PATENT DOCUMENTS

| | | | |
|---|---|---|---|
| 3,805,049 A | 4/1974 | Frank et al. | |
| 4,916,497 A | 4/1990 | Gaul et al. | |
| 6,340,982 B1* | 1/2002 | Taira et al. | 347/130 |
| 6,608,614 B1 | 8/2003 | Johnson | |
| 6,717,376 B2 | 4/2004 | Lys et al. | |
| 6,758,573 B1 | 7/2004 | Thomas et al. | |
| 6,888,322 B2 | 5/2005 | Dowling et al. | |
| 6,897,624 B2 | 5/2005 | Lys et al. | |
| 2001/0053071 A1 | 12/2001 | Yoda et al. | |
| 2002/0070914 A1 | 6/2002 | Bruning et al. | |
| 2002/0152045 A1 | 10/2002 | Dowling et al. | |
| 2002/0159002 A1 | 10/2002 | Chang | |
| 2003/0193085 A1* | 10/2003 | Hogerl et al. | 257/686 |
| 2004/0100796 A1 | 5/2004 | Ward | |
| 2004/0145917 A1 | 7/2004 | Eisenstadt | |
| 2004/0262623 A1 | 12/2004 | You | |
| 2005/0001537 A1 | 1/2005 | West et al. | |

(Continued)

FOREIGN PATENT DOCUMENTS

JP 63-271229 11/1988
(Continued)

OTHER PUBLICATIONS

Advanced Imaging Pro, *NEC Ships 21.3-Inch LCD with RGB LED Back-Lighting*, M2PressWIRE via NewsEdge (posted Mar. 11, 2005), http://www.advancedimagingpro.com.article/printer.jsp?id=621, accessed Jun. 21, 2005.

(Continued)

*Primary Examiner* — William Carter
(74) *Attorney, Agent, or Firm* — Myers Bigel Sibley & Sajovec, P.A.

(57) ABSTRACT

A light emitting apparatus includes multiple Light Emitting Diode (LED) device controller integrated circuits and multiple LEDs of same color, but of different electrical and/or optical characteristics. A respective LED is electrically connected to a respective LED device controller integrated circuit. The respective LED may also be mounted on the respective LED device controller integrated circuit. The LED device controller integrated circuits are configured to independently control a current and/or voltage that is provided to the LED that is electrically thereto, so as to compensate for the different electrical and/or optical characteristics of the LEDs of the same color.

28 Claims, 6 Drawing Sheets

U.S. PATENT DOCUMENTS

| | | | |
|---|---|---|---|
| 2005/0051789 | A1 | 3/2005 | Negley et al. |
| 2005/0062446 | A1 | 3/2005 | Ashdown |
| 2005/0168421 | A1 | 8/2005 | Hirose et al. |
| 2005/0169812 | A1* | 8/2005 | Helf et al. ............... 422/123 |
| 2005/0212404 | A1* | 9/2005 | Chen et al. ............... 313/500 |
| 2006/0097978 | A1 | 5/2006 | Ng et al. |
| 2006/0104090 | A1* | 5/2006 | Lengyel et al. ........... 362/612 |
| 2006/0109205 | A1 | 5/2006 | Deng |
| 2006/0197474 | A1 | 9/2006 | Olsen |
| 2006/0232969 | A1 | 10/2006 | Bogner et al. |

FOREIGN PATENT DOCUMENTS

| | | |
|---|---|---|
| JP | 10-10997 A | 1/1998 |
| JP | 11-162233 | 6/1999 |
| JP | 2000-272166 | 10/2000 |
| JP | 2001-282118 | 10/2001 |
| JP | 2004-29370 A | 1/2004 |
| JP | 2004-333583 A | 11/2004 |
| JP | 2006-278125 A | 10/2006 |
| WO | WO 02/079862 A2 | 10/2002 |

OTHER PUBLICATIONS

Color Kinetics Incorporated, *Color Kinetics: Products & Services: OEM*, http://colorkinetics.com/products/oem/chips/chromasic/, accessed Jul. 1, 2005.

Color Kinetics Incorporated, *News Release: Color Kinetics Facilitates Adoption of Intelligent Solid-State Lighting With New OEM Product Offerings*, http://phx.corporate-ir.net/phoenix.zhtml?c+178448&p=irol-newsArticle_print&ID=690729, accessed Jul. 1, 2005.

Color Kinetics Incorporated, *Preliminary: Chromasic 1*, Item # 118-000085-00, 2005.

Negley et al., *Light Emitting Diode Arrays for Direct Backlighting of Liquid Crystal Displays*, U.S. Appl. No. 11/022,332, filed Dec. 23, 2004.

Negley et al., *Semiconductor Light Emitting Device Mounting Substrates and Packages Including Cavities and Cover Plates, and Methods of Packaging Same*, U.S. Appl. No. 11/011,748, filed Dec. 23, 2004.

Negley, *Reflective Optical Elements for Semiconductor Light Emitting Devices*, U.S. Appl. No. 10/898,608, filed Jul. 23, 2004.

Negley, *Solid Metal Block Semiconductor Light Emitting Device Mounting Substrates and Packages Including Cavities and Heat Sinks, and Methods of Packaging Same*, U.S. Appl. No. 10/972,910, filed Oct. 25, 2004.

Notification of Transmittal of the International Search Report and the Written Opinion of the International Searching Authority, or the Declaration, Written Opinion of the International Searching Authority and International Search Report, PCT/US2006/026946, Jul. 12, 2006.

Wikipedia, the free encyclopedia, *DMX (lighting)*, http://en.wikipedia.org/wiki/DMS_(lighting), accessed Jul. 1, 2005.

Official Action corresponding to Japanese Patent Application No. 2008-522819 mailed on Mar. 4, 2011; 2 pages.

Office Action and English language translation, JP Application No. 2008-522819, May 15, 2012.

* cited by examiner

INDEPENDENT CONTROL OF LIGHT EMITTING DIODES

CROSS-REFERENCE TO RELATED APPLICATIONS

This application is a continuation of U.S. application Ser. No. 11/865,114, filed Oct. 1, 2007, now abandoned entitled Independent Control of Light Emitting Diodes for Backlighting of Color Displays, which itself is a divisional of U.S. application Ser. No. 11/185,397, filed Jul. 20, 2005, now abandoned entitled Independent Control Of Light Emitting Diodes For Backlighting of Color Displays, assigned to the assignee of the present application, the disclosures of both of which are hereby incorporated herein by reference in their entirety as if set forth fully herein.

FIELD OF THE INVENTION

This invention relates to light emitting apparatus and, more particularly, to light emitting apparatus that use Light Emitting Diodes (LEDs), which may be used, for example, for backlighting of displays such as Liquid Crystal Displays (LCDs).

BACKGROUND OF THE INVENTION

Display screens are widely used for computer monitors, televisions and many other consumer and commercial display applications. Some flat panel display screens include an array of optical shutters and a backlight system that impinges light on the display screen.

For example, LCD devices are widely used in flat panel displays for monitors, televisions and other consumer and commercial display applications. As is well known to those having skill in the art, an LCD display generally includes an array of LCD devices that act as an array of optical shutters. Transmissive LCD displays employ backlighting using, for example, fluorescent cold cathode tubes above, beside and sometimes behind the array of LCD devices. A diffusion panel behind the LCD devices can be used to redirect and scatter the light evenly to provide a more uniform display.

Conventional shuttered display devices generally include three different color picture elements (often referred to as pixels and/or subpixels), generally red (R), green (G) and blue (B) picture elements. A backlight system for shuttered display devices may be configured to uniformly radiate light on the display screen that provides the appearance of white light. As used herein, "different colors" means different frequency spectra having different center frequencies.

It is also known to provide an array of fluorescent cold cathode tubes behind and facing the planar array of LCD devices. Unfortunately, an array of fluorescent cold cathode tubes may increase the thickness of the LCD display and/or increase the power consumption thereof. It also may be difficult to uniformly illuminate the planar array of LCD devices with the array of fluorescent cold cathode tubes.

Semiconductor light emitting devices, such as Light Emitting Diode (LED) devices, also may be used for edge illumination of a planar array of LCD devices. For example, U.S. patent application Ser. No. 10/898,608, filed Jul. 23, 2004, entitled Reflective Optical Elements for Semiconductor Light Emitting Devices, to the present inventor Negley, and assigned to the assignee of the present invention, the disclosure of which is hereby incorporated herein by reference in its entirety as if set forth fully herein, describes side emission LEDs that may be used for large area LCD and/or television backlighting.

LED devices also may be used for direct backlighting of LCD displays. For example, U.S. patent application Ser. No. 11/022,332, filed Dec. 23, 2004, entitled Light Emitting Diode Arrays For Direct Backlighting Of Liquid Crystal Displays, to the present inventor Negley, and assigned to the assignee of the present invention, the disclosure of which is hereby incorporated herein by reference in its entirety as if set forth fully herein, describes a display panel for a flat panel display that includes a planar array of LCD devices and a planar array of LED devices that is closely spaced apart from the planar array of LCD devices, to provide backlighting for the planar array of LCD devices.

As is well known to those having skill in the art, the electrical and/or optical parameters of individual LED devices that are fabricated may vary considerably, for example, due to routine process variations. In order to provide backlighting uniformity and/or to provide a desired backlighting color point, it may be desirable to sort or "bin" LED devices that are to be used for backlighting applications, to allow close matching of electrical and/or optical parameters of the LED devices. Unfortunately, this binning may produce additional manufacturing complexity and/or may lead to at least some of the LED devices being rejected as being unsuitable. Binning and/or rejection of some LED devices also may increase the resultant cost of LED backlighting systems.

SUMMARY OF THE INVENTION

Exemplary embodiments of the invention provide edge and/or direct backlighting systems for color display screens that include an array of color picture elements. These backlighting systems include a plurality of clusters of LED devices of different colors that are configured to radiate light of the different colors in a light path that impinges on the color display screen, to provide backlighting on the color display screen. An LED device controller also is provided that is configured to independently control operating parameters of subsets of the clusters of LED devices. In some embodiments, the LED device controller is configured to independently control the operating parameters of individual clusters of LED devices. In other embodiments, the LED device controller is configured to independently control the operating parameters of individual LED devices in individual clusters of LED devices. In yet other embodiments, the LED device controller is configured to use a common data line. In some embodiments, the operating parameters of the subsets, clusters and/or individual LED devices may be controlled to provide uniform backlighting, by compensating for electrical/optical parameter differences among the LED devices and/or to provide a desired color point of the backlighting, by compensating for electrical/optical parameter differences among the LED devices.

In other embodiments of the present invention, a plurality of LED device controllers is provided, a respective one of which is configured to control operating parameters of a subset of the clusters of LED devices. In other embodiments, a respective LED device controller is configured to control the operating parameters of a single cluster of LED devices, and, in some embodiments, to control the operating parameters of the individual LED devices in the cluster. A common data line also may be used in some embodiments.

Various packaging techniques for edge and/or direct backlight LED devices and LED device controllers may be provided according to various embodiments of the present invention. For example, in some embodiments, a respective cluster of LED devices comprises a red, a blue and a green LED device, and the plurality of LED device controllers comprise a plurality of LED device controller integrated circuits. In some embodiments, a respective cluster comprising a red, a blue and a green LED device is mounted on a respective LED device controller integrated circuit. Multiple LED device controller integrated circuits may be mounted on a mounting substrate. In some embodiments, a reflector also may be provided between a respective cluster of red, blue and green LED devices, and a respective LED device controller integrated circuit.

In still other embodiments, a respective cluster comprising a red, blue and green LED device and a respective LED device controller integrated circuit are mounted on a common substrate. The common substrate may include a reflector adjacent the cluster of LED devices. The common substrates may be mounted on a mounting substrate.

In any of the above-described embodiments, at least some of the LED controller integrated circuits may be electrically connected to a common data line. The plurality of LED device controllers may be configured to control operating parameters of the LED devices, and thereby provide uniform backlighting and/or a desired color point of the backlighting, by compensating for electrical/optical parameter differences among the LED devices.

It will be understood that embodiments of the invention have been described above in connection with edge and/or direct backlight systems for color display screens. However, other embodiments of the present invention can provide backlighting methods for color display screens, wherein operating parameters of subsets of the clusters of LED devices are independently controlled during operation thereof.

DETAILED DESCRIPTION

Figure 1:
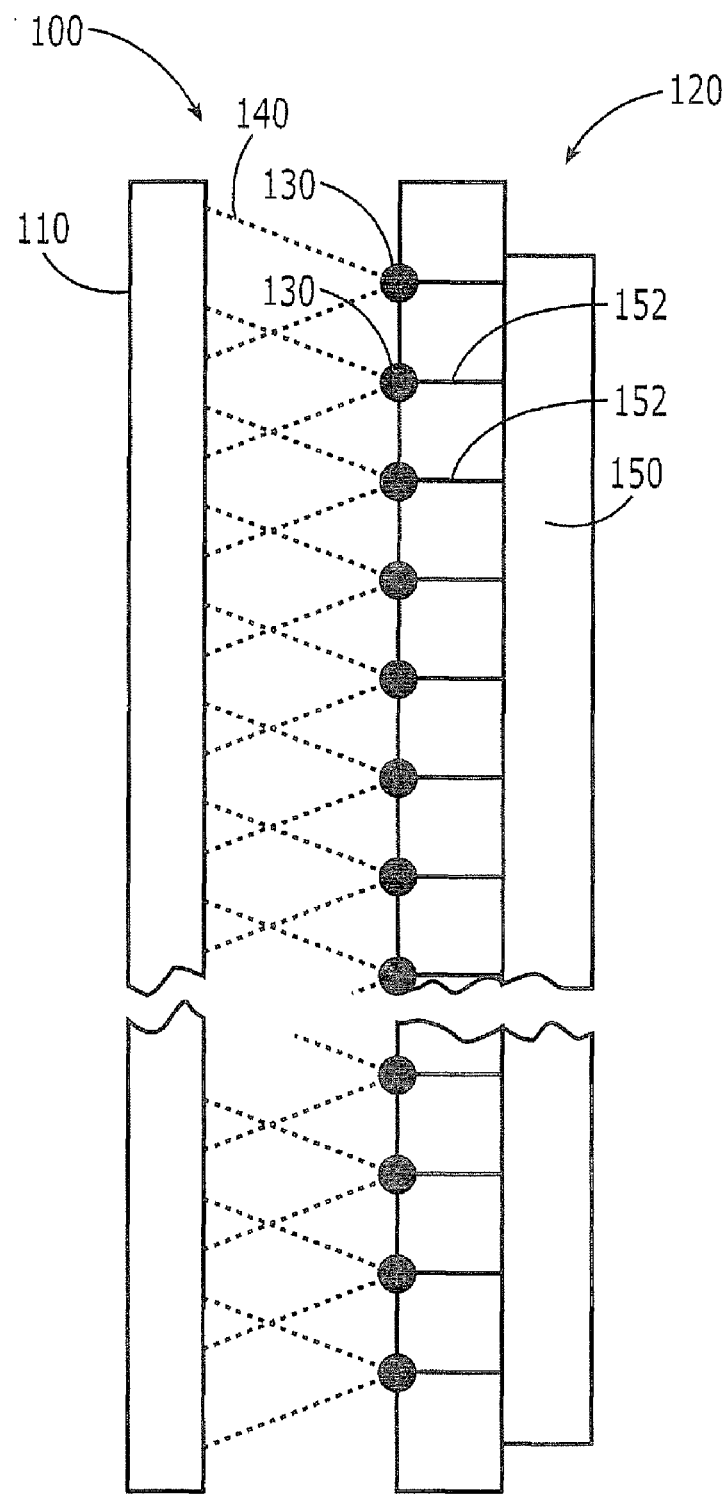
FIGS. 1-4 are cross-sectional views of color display screens including backlighting systems/methods according to exemplary embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element, such as a layer or region, is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention.

Furthermore, relative terms, such as "lower", "base", or "horizontal", and "upper", "top", or "vertical" may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Moreover, the terms "front" and "back" are used herein to describe opposing outward faces of a flat panel display. Conventionally, the viewing face is deemed the front, but the viewing face may also be deemed the back, depending on orientation.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a cross-sectional view of a color display screen including a backlighting system/method according to exemplary embodiments of the present invention. As shown in FIG. 1, these color display screens 100 include an array of color picture elements 110, such as a three-dimensional array of color LCD devices. As is well known to those having skill in the art, the array of color picture elements 110 may include a liquid crystal substance between pieces of glass or other material, and may also include polarizing films and one or more electrode layers. The design of an array of color LCD picture elements is well known to those having skill in the art, and need not be described further herein.

Still referring to FIG. 1, a backlighting system 120 includes a plurality of clusters 130 of LED devices of different colors that are configured to radiate light of the different colors in a light path 140 that impinges on the color display screen 110, to provide backlighting on the color display screen 110. It will be understood that a cluster of LED devices of different colors includes at least two LEDs of different colors, but may also include more than one LED of a given color. An LED device controller 150 is configured to independently control operating parameters of subsets of the clusters 130 of LED devices. In some embodiments, the LED device controller 150 may be configured to independently control parameters of subsets of two or more of the clusters of LED devices. Moreover, in some embodiments, as illustrated in FIG. 1, the LED device controller is configured to individually control the operating parameters of individual clusters 130 of LED devices, as shown schematically by the individual connections 152 between the controller 150 and the individual clusters 130 of LED devices. In other embodiments, individual clusters 130 of LED devices may be controlled without the need for individual connections 152 between the controller 150 and the individual clusters 130, as will be described in detail below.

In some embodiments, the LED device controller 150 is configured to control operating parameters of the clusters 130 of LED devices, to provide uniform backlighting, by compensating for electrical and/or optical parameter differences among the LED devices. As used herein, "uniform" backlighting means that an ordinary viewer, who views the display at a conventional viewing distance, is not aware of variation in backlighting intensity. In some embodiments, variations of less than about 25% may provide uniform intensity, whereas, in other embodiments, variations of less than 5% may provide uniform intensity. In still other embodiments of the invention, the LED device controller 150 is configured to control operating parameters of the clusters 130 of LED devices, to provide a desired color point in the backlighting, by compensating for electrical/optical parameter differences among the LED devices. As is well known to those having skill in the art, a color point may refer to a point on a color spectral chart, for example represented by a set of x and y coordinates in a CIE1931 spectral chart. Operating parameters of the clusters 130 of LED devices may also be controlled to achieve other potentially desired results, such as a time and/or space varying color point.

Accordingly, exemplary embodiments of the invention can provide uniform backlighting and/or a desired color point of the backlighting, notwithstanding that the individual clusters of LED devices may have a wide variation in electrical and/or optical parameters, such as forward voltage and/or optical efficiency. The sorting or binning of large numbers of LED devices for uniformity of optical and/or electrical parameters may not need to be performed and/or relaxed binning standards may be used, because the operating parameters of the LED devices in a given backlight system may be controlled in subsets and/or individually, according to embodiments of the present invention.

Figure 2:
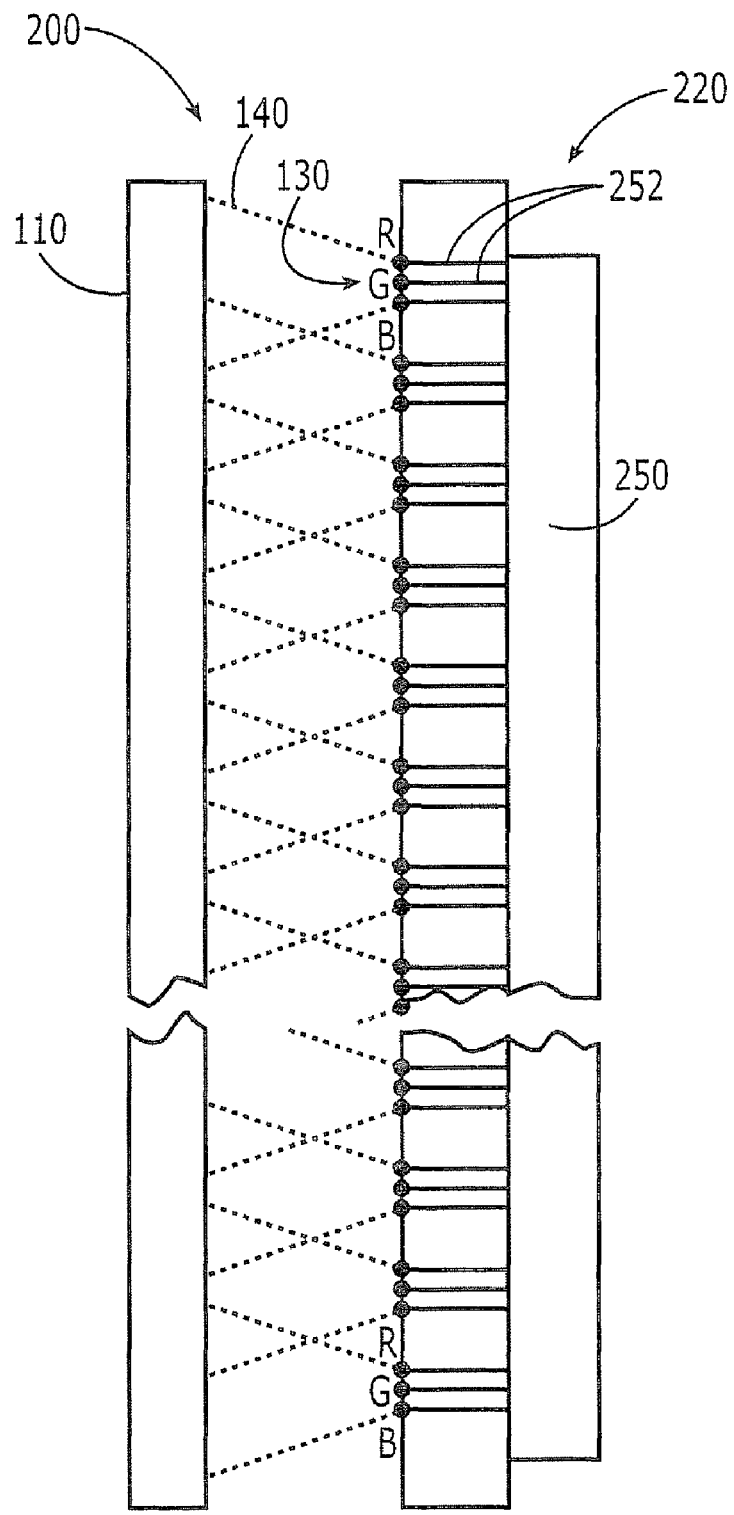

FIG. 2 is a cross-sectional view of color display screens 200 including backlighting systems/methods 220, according to other exemplary embodiments of the present invention. In these embodiments, the LED devices in a cluster 130 comprise a red, a green and a blue LED device R, G, B, respectively. An LED device controller 250 is configured to independently control the operating parameters of individual LED devices R, G, B, in individual clusters 130, as indicated by the control lines 252. In some embodiments, two green LED devices are used. The two green LED devices may emit green light of the same or different frequencies.

It will be understood by those having skill in the art that embodiments of FIGS. 1 and 2 may use a relatively large number of control lines 152 and/or 252 between the LED clusters 130 and the respective controller 150, 250. In contrast, embodiments of FIGS. 3 and 4, which will now be described, can use common data lines to allow the number of control lines that are used to be reduced.

Figure 3:
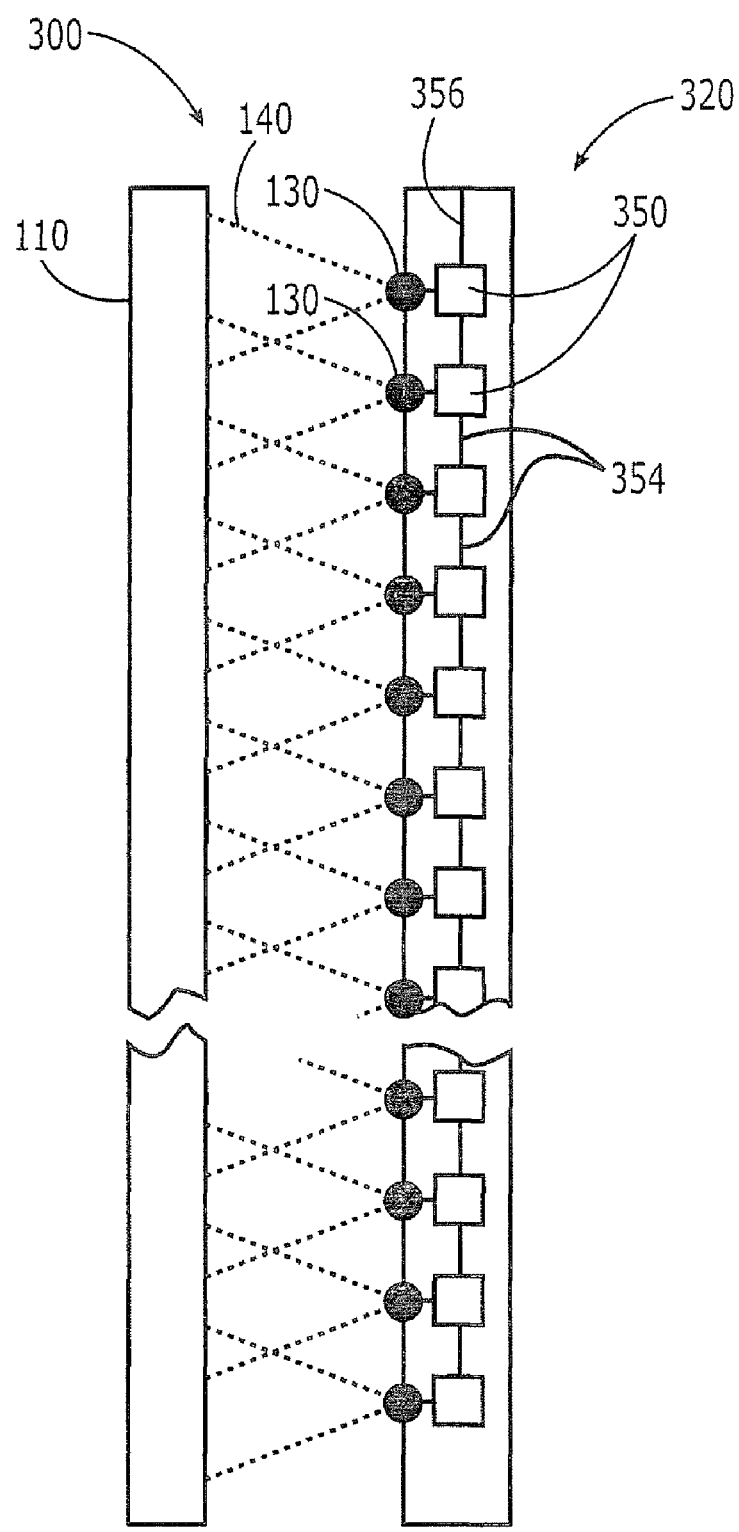

More specifically, FIG. 3 is a cross-sectional view of a color display screen 300 according to other embodiments of the invention, wherein a backlighting system/method 330 includes a plurality of LED device controllers 350, a respective one of which is configured to control operating parameters of a subset of the clusters 130 of LED devices. In some embodiments, a respective LED device controller 350 may be configured to control operating parameters of two or more clusters 130 of LED devices. In other embodiments, as shown in FIG. 3, a respective LED device controller 350 may be configured to control the operating parameters of a single cluster 130 of LED devices.

Moreover, as shown in FIG. 3, the plurality of LED device controllers 350 may be embodied as a plurality of LED device controller integrated circuits that may be electrically connected to one another by a common data line 354. In FIG. 3, a serial connection is illustrated. However, parallel or combined parallel-serial connections to the common data line also may be provided. According to some embodiments of the present invention, the individual LED device controllers 350 may be addressed using well known addressing techniques, via the common data line 354. Common power supply/ground lines and/or other lines also may be provided. Accordingly, the number of external connections 356 that are used for external connection to an LED backlighting external device can be reduced or minimized.

Figure 4:
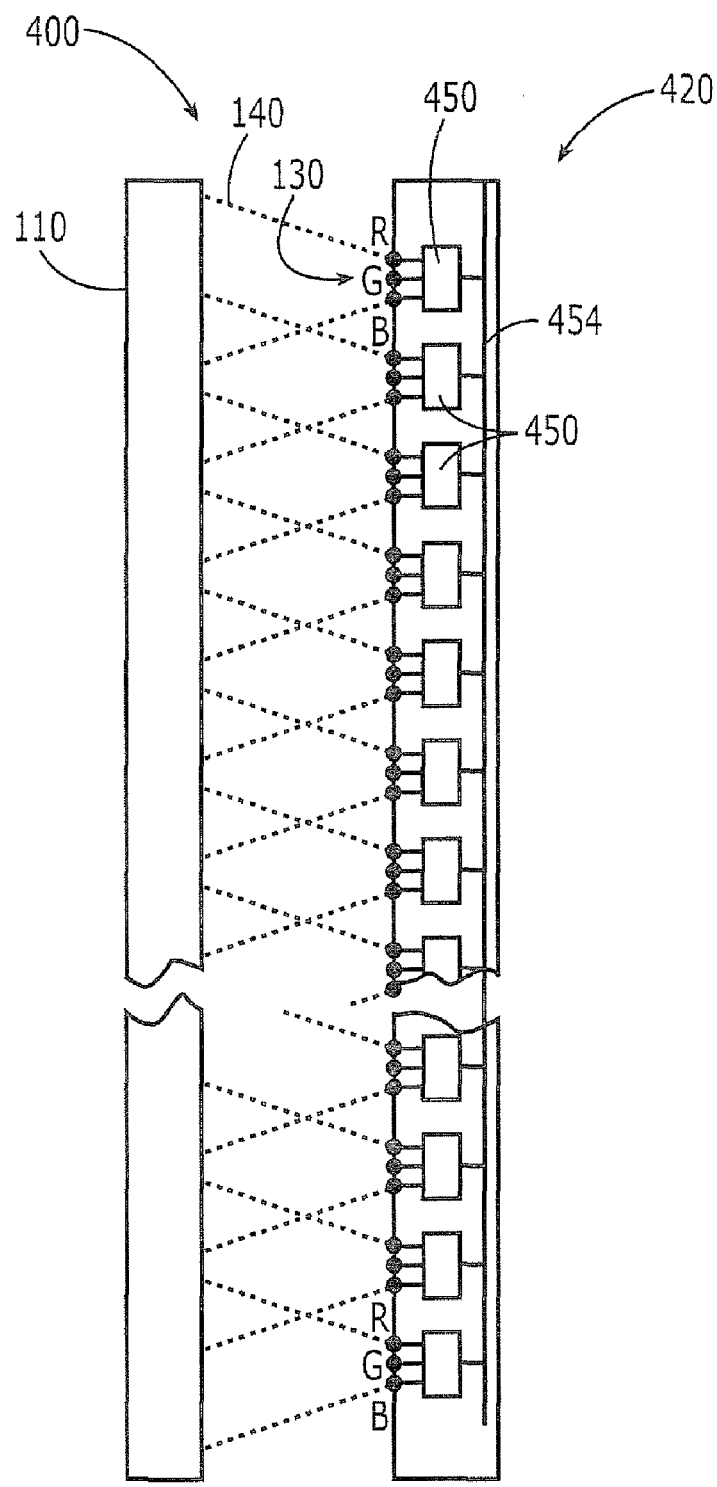

FIG. 4 illustrates a color display screen 400 including backlighting systems/methods 420 according to still other embodiments of the present invention, wherein a given LED device controller 450 is configured to independently control operating parameters of individual ones of the red, green and blue LEDs R, G, B, respectively, in a given cluster 130. As also shown in FIG. 4, this independent control may be provided using a common data line 454. In FIG. 4, the individual LED device controllers 450 are connected to the common control line 454 in parallel. However, series and/or series-parallel connections also may be provided. The common data line 454 can reduce the number of external connections for the backlight system 420. It will be understood that other common connection lines, such as power supply, ground and/or or other common connection lines, also may be provided.

It also will be understood by those having skill in the art that embodiments of FIGS. 1-4 may be combined in various combinations and subcombinations.

Figure 5:
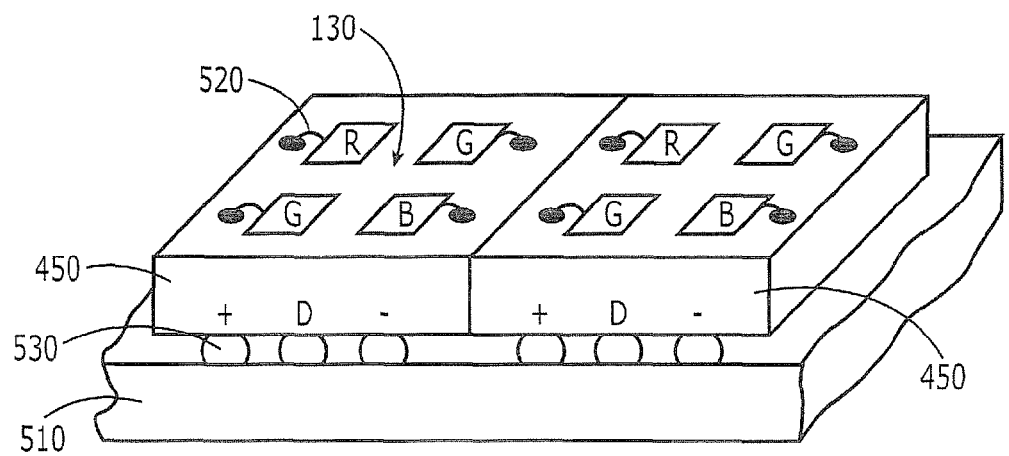
FIGS. 5-7 are perspective views of backlighting systems/methods according to exemplary embodiments of the present invention.
Figure 6:
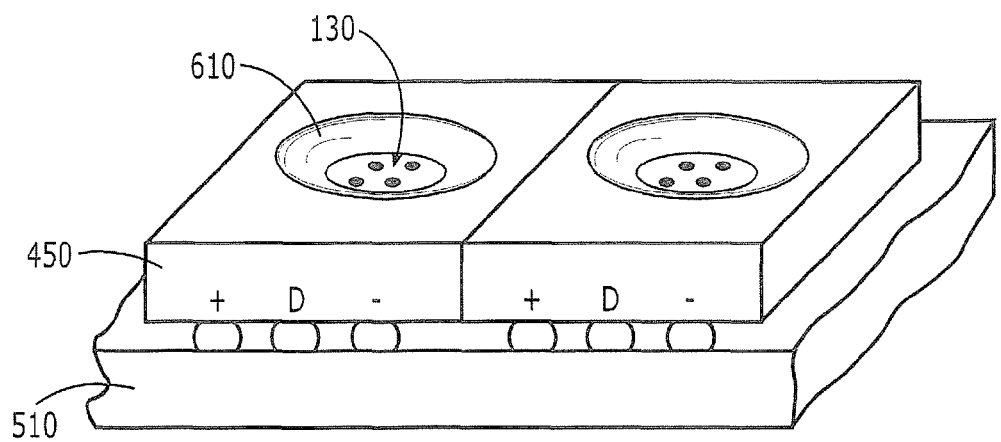
Figure 7:
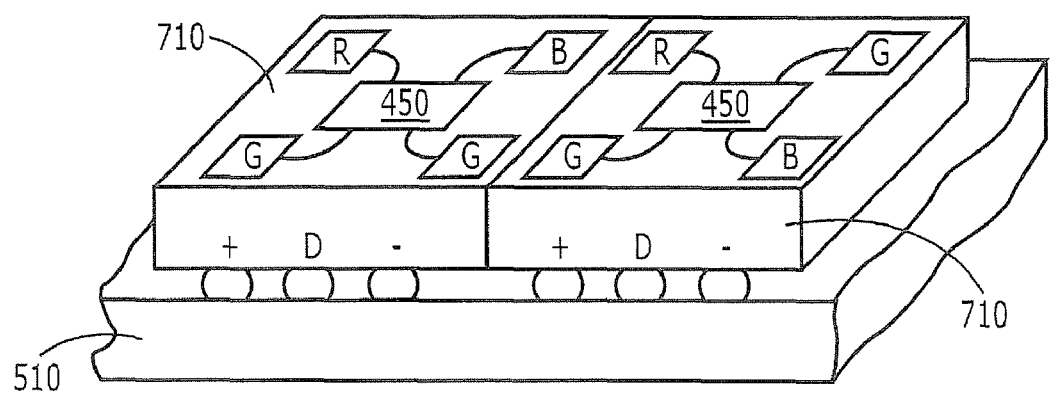

FIGS. 1-4 provided schematic cross-sectional views of embodiments of the present invention. FIGS. 5-7 are perspective views of packaging techniques for embodiments of FIGS. 1-4, according to exemplary embodiments of the present invention.

In particular, as shown in FIG. 5, a respective cluster 130 of LED devices comprising a red, a green and a blue LED device R, G, B, is mounted on a respective LED device controller integrated circuit 450. A mounting substrate 510 also is provided, in some embodiments, and the plurality of LED device controller integrated circuits 450 are mounted on the mounting substrate 510. As shown in FIG. 5, wire bonds 520 may be used to electrically connect the individual LED devices in a cluster 130 to the LED device controller integrated circuits 450. However, other conventional electrical connection techniques, such as solder bumps, may be used. Moreover, solder bumps 530 may be used to connect a LED device controller integrated circuit 450 to a mounting substrate 510. However, other conventional electrical connection techniques, such as wire bonding, also may be used. The common data line 454 of FIG. 4 is illustrated by "D". Common power supply connections are indicated by "+" and "−" designations. It will be understood that, although embodiments of FIG. 5 may correspond to FIG. 4, analogous embodiments for FIGS. 1-3 also may be provided.

It also will be understood that multiple LED devices of a given color may be used in a cluster. Thus, for example, as shown in FIG. 5, two green LED devices may be used in a cluster 130 of FIG. 5, to compensate for the relatively lower output of green LED devices compared to red or blue LED devices.

FIG. 6 illustrates other embodiments of the present invention, wherein a reflector 610 is provided adjacent the cluster 130. As shown in FIG. 6, a reflector 610 may be provided between a respective cluster 130 that comprises a red, a blue and a green LED device, and a respective LED device controller integrated circuit 450. The reflector may be embodied by a reflective cavity integrated in a substrate, as described in application Ser. No. 10/659,108, filed Sep. 9, 2003, entitled Solid Metal Block Mounting Substrates for Semiconductor Light Emitting Devices; application Ser. No. 11/011,748, filed Dec. 14, 2004, entitled Semiconductor Light Emitting Device Mounting Substrates And Packages Including Cavities And Cover Plates, And Methods Of Packaging Same; application Ser. No. 11/022,332, Filed Dec. 23, 2004, entitled Light Emitting Diode Arrays For Direct Backlighting Of Liquid Crystal Displays; and/or application Ser. No. 10/972,910, filed Oct. 25, 2004, Solid Metal Block Semiconductor Light Emitting Device Mounting Substrates And Packages Including Cavities And Heat Sinks, And Methods Of Packaging Same, all of which are assigned to the assignee of the present invention, the disclosures of all of which are hereby incorporated herein by reference in their entirety as if set forth fully herein. In other embodiments, a freestanding reflector may be provided between the LED devices 130 and the controller integrated circuit 450. Many other configurations of freestanding and/or integrated reflectors may be provided.

FIG. 7 illustrates other packaging techniques according to exemplary embodiments of the present invention, wherein an LED device controller 450 is mounted on a common substrate 710 along with the red, green and blue LEDs in a cluster. The common substrate 710 may itself be mounted on a mounting substrate 510. In still other embodiments, the common substrate 710 may not be needed, and the individual LED device controllers 450 and the associated LED devices may be directly mounted on a mounting substrate 510. Finally, in still other embodiments, the controller 450 and the associated LED devices may be mounted in a reflector, as was shown at 610 in FIG. 6. A common substrate 710 may or may not be used.

It will be understood that the packaging schemes of FIGS. 5-7 may be combined in various combinations and subcombinations. Moreover, although connections of the controller integrated circuit 450 and of the common substrate 710 are shown on both sides thereof, other embodiments may provide connections, such as wire bonds, on a single side thereof.

Some embodiments of the present invention have been described above in connection with a plurality of LED device controllers 450 that may be electrically connected to a common data line. The design of such LED controllers are well known to those having skill in the art. For example, LED controllers 450 may be embodied as Chromasic™ 1 microchips, marketed by Color Kinetics Incorporated. As described in the Color Kinetics website, "Chromasic™ 1 is a custom-designed microchip that integrates power, communications, and control, to enable next-generation digital lighting systems and networks. Chromasic combines digital LED control and communication technology in a tiny package, enabling highly controllable lamp nodes to generate 64 billion color combinations. The fully-integrated, three channel, 12-bit LED driver encompasses all components necessary to receive a serial command bitstream, decode and extract PWM values, and re-create a new serial bitstream. Also included are a high accuracy bandgap reference, external programming circuit, and all necessary circuitry to drive three independent LED channels. All that is required to create a controlled RGB light node are: LEDs, a single resistor for current programming, and a single bypass capacitor. Chromasic 1 is available in 8-pin SC8 package. Inherent in the design is the self-addressing of Chromasic. This means that each Chromasic-based light element, whether it is a fixture or a single pixel address itself based solely on its location within the network. This provides an easy, scalable solution for large scale lighting applications as well as video and electronic displays." See colorkinetics.com/products/owm/chips/chromasic/.

It will also be understood that other conventional color controllers may be used in other embodiments of the invention. Such color controllers are widely used in many other applications. Such color controllers may use the well known DMX lighting protocol. The DMX protocol, which can include the DMX512 protocol, was developed by the Engineering Commission of USITT in 1986, with subsequent revisions in 1990 and 2004. The 2004 standard is also known as DMX512-A. Multiple light fixtures may be controlled under the DMX standard using a common 3-pin cable.

In some embodiments, a 24" diagonal LCD display may employ a 24" diagonal backlighting system that includes 280 clusters of RGGB LED devices in an array of 14 rows and 20 columns of clusters. In some embodiments, each of the 1120 LED devices (4 LED devices in each of 280 clusters) may use a minimum of 1120 external connections in order to allow individual addressing. In contrast, other embodiments of the present invention can allow as few as three external connections for common power, ground and data, to individually control the 1120 LED devices. A single common set of power, ground and data connections may be provided to subsets of the 280 clusters, such as to an individual row of LED clusters, which may be addressed by a common data connection. It will also be understood that embodiments of the invention have been described herein in connection with array backlighting.

However, edge backlighting of an LCD display can also be provided according to other embodiments of the present invention.

As was described above, conventional LED backlighting systems and methods may place LED devices in series and/or parallel strings. It may be desirable for the LEDs in a series string to be run at the same current, and it may be desirable for the parallel strings to be voltage matched. Current or voltage matching may place strict requirements on binning of the forward voltages and/or other parameters of the LED devices. In sharp contrast, some embodiments of the present invention allow an Application-Specific Integrated Circuit (ASIC) to be used to individually address each LED in an LED backlight array. This can allow color balancing of each pixel by driving each LED at a desired current to achieve a desired "white point".

Moreover, by incorporating DMX and/or other processing, only three external connections may be needed from board to board, which can thereby reduce or minimize the number of external interconnects. As was also described above, the LED clusters, such as an RGB or an RGGB cluster, can be mounted on top of the ASIC itself, with optical features such as reflectors included to provide light extraction and/or to improve performance. Only three signals may need to exist: positive, negative and data signals, according to some embodiments of the present invention. Each integrated circuit controller location may be known, and can be individually addressed with respect to drive current. Hence, each integrated circuit can be independently operated and each LED in each cluster can be individually controlled, in some embodiments.

Finally, it will be understood that embodiments of the invention have been described primarily with respect to LCD displays. However, other shuttered color displays, such as Digital Light Projector (DLP) displays, may be used in other embodiments of the present invention. Accordingly, a desired color (defined, for example, in x, y coordinates from the 1931 CIE diagram and/or by u', v' coordinates from the 1976 UCS CIE diagram), a desired color intensity and/or a desired uniformity may be obtained by individually controlling each pixel, while allowing wider wavelengths or color bins of the individual R, G and B dice to be used.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A light emitting apparatus, comprising:
a Light Emitting Diode (LED) device controller integrated circuit microchip that includes an LED device driver; and
an LED mounted directly on the LED device controller integrated circuit microchip and electrically connected thereto.

2. An apparatus according to claim 1 wherein the LED device controller integrated circuit microchip includes a face having a reflective cavity therein and wherein the LED is mounted directly in the reflective cavity.

3. An apparatus according to claim 1 wherein the LED comprises a red LED, a green LED and a blue LED mounted directly on the LED device controller integrated circuit microchip and electrically connected thereto.

4. An apparatus according to claim 1 further comprising a mounting substrate, wherein the LED is mounted directly on a first face of the LED device controller integrated circuit microchip and wherein a second face of the LED device controller integrated circuit microchip that is opposite the first face is mounted on the mounting substrate and electrically connected thereto.

5. An apparatus according to claim 1 wherein the LED device controller integrated circuit microchip is configured to independently control a current and/or voltage that is provided to the LED that is mounted directly thereon and electrically connected thereto so as to compensate for variations in electrical and/or optical characteristics of the LED that is mounted directly thereon and electrically connected thereto, relative to other LEDs of same color.

6. An apparatus according to claim 1 wherein the LED device controller integrated circuit microchip is configured to independently control a current and/or voltage that is provided to the LED that is mounted directly thereon and electrically connected thereto so as to provide uniform optical output of the LED that is mounted directly thereon and electrically connected thereto notwithstanding variations in electrical and/or optical characteristics of the LED that is mounted directly thereon and electrically connected thereto, relative to other LEDs of same color.

7. An apparatus according to claim 1 wherein the LED device controller integrated circuit microchip is configured to independently control a current and/or voltage that is provided to the LED that is mounted directly thereon and electrically connected thereto so as to provide a uniform color point of the LED that is mounted directly thereon and electrically connected thereto notwithstanding the variations in electrical and/or optical characteristics of the LED that is mounted directly thereon and electrically connected thereto, relative to other LEDs of same color.

8. An apparatus according to claim 1 wherein the LED device controller integrated circuit microchip is electrically connected to a common data line and is addressed via the common data line.

9. An apparatus according to claim 8 wherein the LED device controller integrated circuit microchip is also electrically connected to a common power supply line.

10. An apparatus according to claim 1 wherein the apparatus is included in a backlight system for a flat panel color display screen that includes an array of optical shutter color picture elements.

11. A light emitting apparatus, comprising:
a plurality of Light Emitting Diode (LED) device controller integrated circuit microchips that include an LED device driver; and
a plurality of LEDs of same color but of different electrical and/or optical characteristics, a respective LED being electrically connected to and mounted directly on a respective LED device controller integrated circuit microchip, a respective LED device controller integrated circuit microchip configured to independently control a current and/or voltage that is provided to the LED of the given color that is electrically connected thereto so as to compensate for the different electrical and/or optical characteristics of the plurality of LEDs of the same color.

12. An apparatus according to claim 11 wherein the respective LED device controller integrated circuit microchip is configured to independently control a current and/or voltage that is provided to the LED of the given color that is electrically connected thereto so as to operate the plurality of plurality of LEDs to provide uniform optical output notwithstanding the different electrical and/or optical characteristics of the plurality of LEDs of the same color.

13. An apparatus according to claim 11 wherein the respective LED device controller integrated circuit microchip is configured to independently control a current and/or voltage that is provided to the LED of the given color that is electrically connected thereto so as to operate the plurality of plurality of LEDs to provide a uniform color point notwithstanding the different electrical and/or optical characteristics of the plurality of LEDs of the same color.

14. An apparatus according to claim 11 wherein a respective LED device controller integrated circuit microchip includes a face having a reflective cavity therein and wherein a respective LED is mounted directly in the respective reflective cavity.

15. An apparatus according to claim 11 wherein the plurality of LEDs comprises a plurality of red LEDs, a plurality of green LEDs and a plurality of blue LEDs, and wherein a respective red, green and blue LED is mounted directly on a respective LED device controller integrated circuit microchip and electrically connected thereto.

16. An apparatus according to claim 11 further comprising a mounting substrate, wherein the a respective LED is mounted directly on a first face of a respective LED device controller integrated circuit microchip and wherein a second face of a respective LED device controller integrated circuit microchip that is opposite the first face is mounted on the mounting substrate and electrically connected thereto.

17. An apparatus according to claim 11 wherein the plurality of LED device controller integrated circuit microchips are electrically connected to a common data line and are individually addressed via the common data line.

18. An apparatus according to claim 17 wherein the plurality of LED device controller integrated circuit microchips are also electrically connected to a common power supply line.

19. An apparatus according to claim 11 wherein the apparatus is included in a backlight system for a flat panel color display screen that includes an array of optical shutter color picture elements.

20. A light emitting apparatus, comprising:
a plurality of Light Emitting Diode (LED) device controller integrated circuit microchips that include an LED device driver; and
a plurality of LEDs of same color but of different electrical and/or optical characteristics, a respective LED being mounted directly on and electrically connected to a respective LED device controller integrated circuit microchip, a respective LED device controller integrated circuit microchip configured to independently control a current and/or voltage that is provided to the LED of the given color that is electrically connected thereto so as to compensate for the different electrical and/or optical characteristics of the plurality of LEDs of the same color.

21. An apparatus according to claim 20 wherein the respective LED device controller integrated circuit microchip is configured to independently control a current and/or voltage that is provided to the LED of the given color that is electrically connected thereto so as to operate the plurality of plurality of LEDs to provide uniform optical output notwithstanding the different electrical and/or optical characteristics of the plurality of LEDs of the same color.

22. An apparatus according to claim 20 wherein the respective LED device controller integrated circuit microchip is configured to independently control a current and/or voltage that is provided to the LED of the given color that is electrically connected thereto so as to operate the plurality of plurality of LEDs to provide a uniform color point notwithstanding the different electrical and/or optical characteristics of the plurality of LEDs of the same color.

23. An apparatus according to claim 20 wherein a respective LED device controller integrated circuit microchip includes a face having a reflective cavity therein and wherein a respective LED is mounted directly in the respective reflective cavity.

24. An apparatus according to claim 20 wherein a the plurality of LEDs comprises a plurality of red LEDs, a plurality of green LEDs and a plurality of blue LEDs, and wherein a respective red, green and blue LED is mounted on a respective LED device controller integrated circuit microchip and electrically connected thereto.

25. An apparatus according to claim 20 further comprising a mounting substrate, wherein the a respective LED is mounted directly on a first face of a respective LED device controller integrated circuit microchip and wherein a second face of a respective LED device controller integrated circuit microchip that is opposite the first face is mounted on the mounting substrate and electrically connected thereto.

26. An apparatus according to claim 20 wherein the plurality of LED device controller integrated circuit microchips are electrically connected to a common data line and are individually addressed via the common data line.

27. An apparatus according to claim 26 wherein the plurality of LED device controller integrated circuit microchips are also electrically connected to a common power supply line.

28. An apparatus according to claim 20 wherein the apparatus is included in a backlight system for a flat panel color display screen that includes an array of optical shutter color picture elements.

* * * * *

UNITED STATES PATENT AND TRADEMARK OFFICE
CERTIFICATE OF CORRECTION

| | | |
|---|---|---|
| PATENT NO. | : 8,328,405 B2 | Page 1 of 1 |
| APPLICATION NO. | : 12/545600 | |
| DATED | : December 11, 2012 | |
| INVENTOR(S) | : Negley | |

It is certified that error appears in the above-identified patent and that said Letters Patent is hereby corrected as shown below:

In the Claims:
Column 12, Claim 24, Line 24: Please correct "wherein a the"
                                        to read -- wherein the --

Column 12, Claim 25, Line 31: Please correct "wherein the a respective"
                                        to read -- wherein the respective --

Signed and Sealed this
Twenty-fourth Day of September, 2013

Teresa Stanek Rea
*Deputy Director of the United States Patent and Trademark Office*